UNITED STATES PATENT OFFICE.

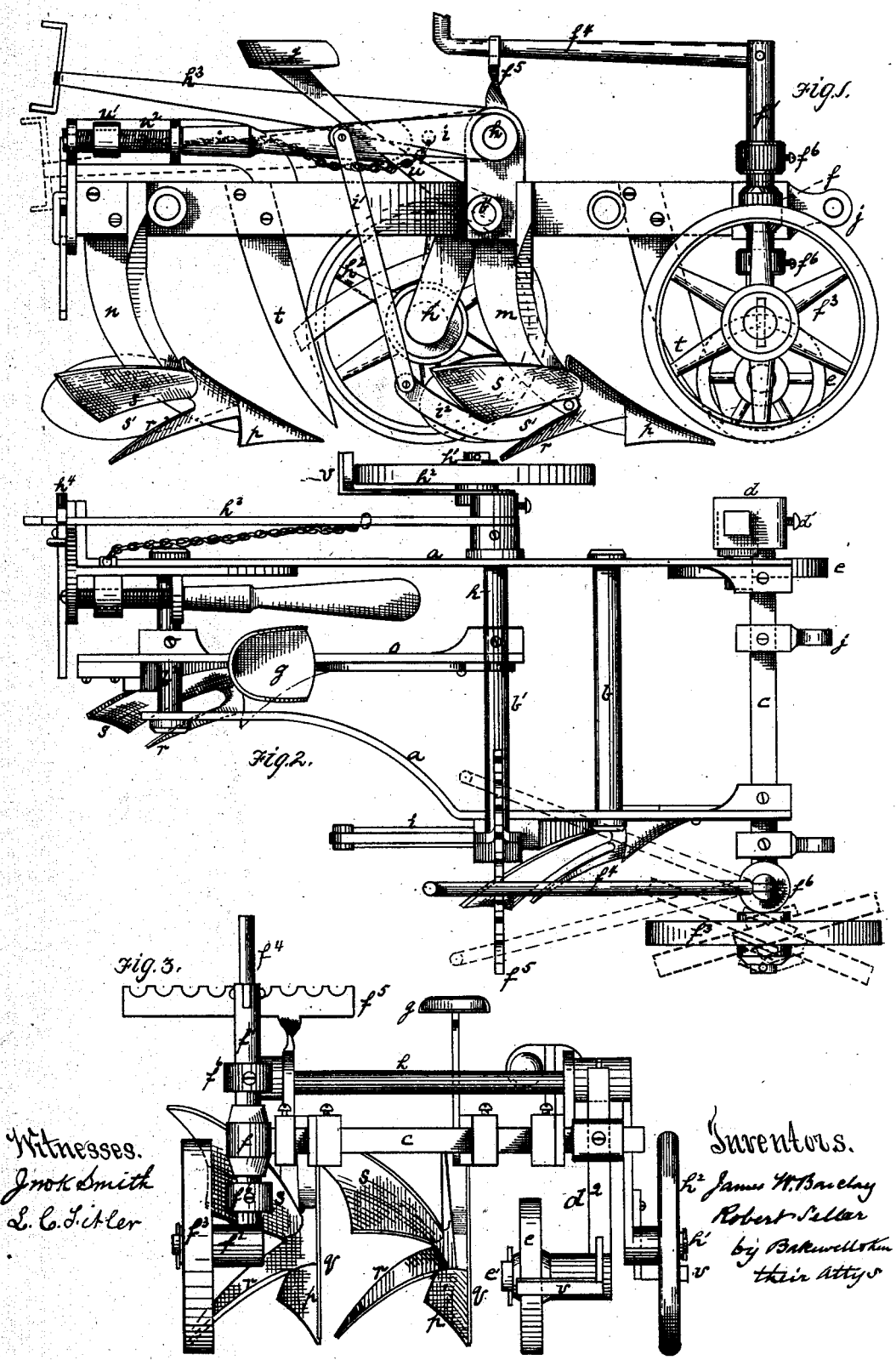

JAMES W. BARCLAY, OF ABERDEEN, AND ROBERT SELLAR, OF HUNTLY, COUNTY OF ABERDEEN, SCOTLAND.

COMBINED PLOW AND DIGGER.

SPECIFICATION forming part of Letters Patent No. 235,490, dated December 14, 1880.

Application filed August 11, 1880. (No model.) Patented in England July 24, 1876.

*To all whom it may concern:*

Be it known that we, JAMES WILLIAM BARCLAY, of Aberdeen, and ROBERT SELLAR, of Huntly, both in the county of Aberdeen, Scotland, have invented a new and useful Improvement in Combined Plow and Digger; and we do hereby declare the following to be a full, clear, and exact description thereof, reference being had to the accompanying drawings, forming part of this specification, in which—

Figure 1 is a side elevation of our improved cultivator and digger. Fig. 2 is a plan view of the same, showing by broken lines the various positions of the guide-wheel; and Fig. 3 is a front elevation.

Like letters of reference indicate like parts in each.

Our invention is an implement of that class designed to supersede the use of both the ordinary plow and cultivator or grubber for plowing and preparing land for crops; and it consists of an implement which, from the character of its operation, we prefer to call a "digger," having one or more blades or tines arranged on the standard between the share and mold-board, and separated therefrom by intervening spaces, said blades projecting laterally backward and upward below the mold-board. The purpose of the blade or tine is to cut the furrow-slice longitudinally, and to pulverize, loosen, and mix the soil of the lower part of the furrow-slice, while the mold-board, which extends back over the blade or tine, raises and turns over the upper part of the furrow-slice.

This implement is preferably arranged in gangs upon a wheeled carriage, which is provided with cutters, a guide-wheel, a driver's seat, and devices for regulating the depth of cut and for raising the plows entirely clear of the surface.

To enable others skilled in the art to make and use our improvement, we will now describe it by specific reference to the drawings, which show a gang of two plows arranged on a wheeled carriage.

The frame is composed of bars $a\ a'$ and cross-pieces $b\ b'\ b^2$, preferably of iron or steel. At the front is a cross-bar, $c$, extending through or beyond the bars $a$. At one end of the bar $c$ is a clamp-yoke, $d$, which encircles the bar $c$, and is provided with a bolt, $d'$, which bears against the side of the bar. Extending downward through holes in the ends of the yoke, on the opposite side of the bar, is a leg, $d^2$, on the lower end of which is a wheel, $e$, mounted on an axle, $e'$. The height of the wheel $e$ on the frame is adjustably regulated by the clamp-yoke $d$ and screw $d'$.

Extending vertically through a sleeve, $f$, at the other end of the bar $c$ is a shaft, $f'$, upon the lower end of which is a short axle, $f^2$, carrying a guide-wheel, $f^3$. At the upper end of the shaft $f'$ is a rod or bar, $f^4$, which extends back to a rack, $f^5$, in the notches of which it rests, and where it is within convenient reach of the driver's seat $g$. It is designed to operate the guide-wheel $f^3$. The height of the frame on the shaft $f'$ is regulated by adjustable collars $f^6$, placed on the shaft above and below the sleeve $f$.

About the center of the frame, and extending across it, is a shaft, $h$, on which, at one side of the machine, there is a crank-axle, $h'$, carrying a large wheel, $h^2$. This wheel is raised from or lowered to the ground by means of a lever, $h^3$, attached to the shaft $h$, which causes the axle $h'$ to be moved either out of or into vertical position as it is either raised or lowered. When the lever is lowered to bring the wheel down to the ground it may be secured in that position by a hook or latch, $h^4$. This wheel is designed for conveyance, and is thrown into use for that purpose, or whenever it is desired to raise the plow out of the furrow or decrease the depth of the cut.

On the opposite end of the shaft $h$ is a short arm, $i$, connected by a link, $i'$, to the rear end of a runner or shoe, $i^2$, the front end of which is pivoted to the standard $m$. When the lever $h^3$ is depressed the shoe $i^2$ is brought to the ground simultaneously with the wheel $h^2$, and the whole frame of the machine is raised, lifting the plow out of the furrows, and causing the weight of the entire structure to come on the wheel $h^2$ and shoe $i^2$.

Extending up from the cross-brace $b'$ is a driver's seat, $g$, and on the front bar, $c$, is a clevis, $j$, for the attachment of the team. The clevis is movable on the bar $c$, and may be secured in any position thereon, either by a set-bolt or by notches.

The front plow-standard, m, is attached to the bar a by bolts, and the rear standard, n, is attached to a bar, o, mounted and sliding on the cross-pieces b' b², being secured in any desired position by clamp-screws. The standards are arranged in a diagonal line across the frame, and can be set at a greater or less angle thereto at will by moving the bar o laterally along the cross-pieces b' b².

Each standard is provided with a share, p, a landside, q, a tine or blade, r, and a mold-board, s. The tine or blade r is arranged between the share p and the mold-board s, and extends laterally backward and downward at any desired angle. It may be straight or twisted, and may present its face or its edge to the furrow-slice, as may be desired. An open space, s', is left between it and the mold-board. The latter extends back over the blade, and has the requisite width, length, and curve to raise and turn over the upper part of the furrow-slice. Instead of one blade, r, there may be two blades, if desired.

The second plow must be set near enough the line of cut of the first to operate on the required breadth of land.

Bolted to the bars a a', in front of the plows, is a cutter, t, for which, if desired, rolling colters may be substituted. The wheels e h² are supplied with scrapers v r.

The operation of the machine is as follows: When it is being drawn to and from the place of use the lever h³ is depressed and secured by the hook h⁴, as shown in Fig. 2. This brings the wheel h² and shoe i² into operation, and raises the frame sufficiently to cause the plows to clear the surface of the ground. The collars f⁶ are placed far enough apart on the shaft f' to permit the sleeve f to slip up on the shaft f' as the frame is raised, and thereby throw up the points of the plows. The guide-wheel f³ is set straight, as shown in Fig. 2. Arriving at the place of use, the lever h³ is thrown up, thereby relieving the wheel h² and shoe i², and permitting the plows to come to the ground. The guide-wheel f³ runs in the last furrow previously made, and is preferably set angling toward the land or vertical side of the said furrow, so as to turn or draw against the said vertical side, and thereby guide or partly guide the line of progress of the machine. The depth of cut that may be made is regulated by the adjustment of the height of the axles of the wheels, while the lever h³, which is within reach of the driver's seat, enables him to regulate the depth of the furrow within the limit of the fixed adjustment of the wheels while plowing. At the headlands the machine is turned by raising the plows and turning the guide-wheel in the required direction. The upward movement of the lever h³ is limited by a chain, u, fastened to a screw-collar, u', on the screw-rod u².

The effect of the operation of this implement is as follows: In case of stubble or grass lands it opens and pulverizes the soil to the required depth, cuts the roots of thistles and other deep-rooted weeds, turns over the upper four or five inches of soil, so as to cover the stubble or soil and expose the roots of the weeds to the winter's frost, and brings up and mixes a portion of the subsoil with the upper mold. It thus combines and accomplishes at one operation the work of both the ordinary plow and cultivator. In case of clean lands it stirs up and pulverizes the earth without exposing the manure or leaving the soil as open as the ordinary plow does, which is an advantage, as it prevents damage to the crops by severe spring winds. In all cases it avoids the packing of the subsoil and consequent separation from the upper soil by the horses' feet in the furrow and by the sole of the plow.

The construction of the various parts of the machine may be varied in different ways—as, for instance, the construction of the frame, the attachment and manner of adjustment of the wheels, the number of plows used, &c.

Instead of the shoe i², another wheel may be used; or there may be a shoe on both sides instead of wheels.

The mold-board may be made of two or more bars or plates.

What we claim as our invention, and desire to secure by Letters Patent, is—

1. The combination, in a plow, of a share, a segmentary mold-board, and one or more interposed horizontal, or substantially horizontal, blades or tines twisted obliquely to the line of draft, the lower side having a cutting-edge, and the blades or tines separated from each other and from the share and mold-board by intervening spaces, substantially as and for the purpose specified.

2. In a gang-plow, a shaft having a crank-axle and carrying-wheel at one end, and a crank-arm, link, and shoe at the opposite end, in combination with a lever for operating the shaft, and a chain and screw-rod for controlling the lever, substantially as and for the purpose specified.

3. A gang-plow having a crank-lever and conveying wheels or shoes for raising the plows out of the furrows, and an independent pivoted guide-wheel, the shaft of which has a limited vertical movement in the collar by which it is attached to the frame, substantially as and for the purposes described.

In testimony whereof we, the said JAMES WILLIAM BARCLAY and ROBERT SELLAR, have hereunto set our hands.

JAMES WILLIAM BARCLAY.
ROBERT SELLAR.

Witnesses:
  CHAS. B. DUNN,
  WALTER W. PALMER,
*Both of 89 Union Street, Aberdeen, Scotland, Advocate's Clerks.*